US011443628B2

(12) United States Patent
Lee et al.

(10) Patent No.: US 11,443,628 B2
(45) Date of Patent: Sep. 13, 2022

(54) METHOD, SYSTEM, AND COMPUTER-READABLE STORAGE MEDIUM FOR MANAGING SHARED VEHICLE

(71) Applicant: PARKINGCLOUD CO., LTD., Seoul (KR)

(72) Inventors: Hwa Jin Lee, Seoul (KR); Sang Yong Shin, Seoul (KR)

(73) Assignee: PARKINGCLOUD CO., LTD., Seoul (KR)

( * ) Notice: Subject to any disclaimer, the term of this patent is extended or adjusted under 35 U.S.C. 154(b) by 0 days.

(21) Appl. No.: 17/262,538

(22) PCT Filed: Jun. 21, 2019

(86) PCT No.: PCT/KR2019/007525
§ 371 (c)(1),
(2) Date: Jan. 22, 2021

(87) PCT Pub. No.: WO2020/022653
PCT Pub. Date: Jan. 30, 2020

(65) Prior Publication Data
US 2021/0358302 A1 Nov. 18, 2021

(30) Foreign Application Priority Data
Jul. 23, 2018 (KR) .......................... 10-2018-0085386

(51) Int. Cl.
*G08G 1/14* (2006.01)
*B60L 53/68* (2019.01)
(Continued)

(52) U.S. Cl.
CPC .............. *G08G 1/144* (2013.01); *B60L 53/68* (2019.02); *G06K 19/06028* (2013.01);
(Continued)

(58) Field of Classification Search
CPC ........ G08G 1/144; G08G 1/017; G08G 1/145; B60L 53/68; G06K 19/06028;
(Continued)

(56) References Cited
U.S. PATENT DOCUMENTS

| 2004/0230498 A1* | 11/2004 | Zimmerman | ...... G06Q 30/0645 705/26.1 |
| 2014/0207498 A1* | 7/2014 | Cho | ........................ G06Q 10/02 705/5 |

(Continued)

FOREIGN PATENT DOCUMENTS

| EP | 3480796 A1 * | 5/2019 | .............. B60L 53/64 |
| JP | H10261199 A | 9/1998 | |

(Continued)

OTHER PUBLICATIONS

International Search Report and Written Opinion issued in PCT/KR2019/007525, dated Oct. 2, 2019, total 10 pages provided, with English translation.

(Continued)

*Primary Examiner* — Ryan W Sherwin
(74) *Attorney, Agent, or Firm* — Hamre, Schumann, Mueller & Larson, P.C.

(57) ABSTRACT

A shared vehicle management system for managing a shared vehicle is described in the present disclosure. The shared vehicle management system includes a return request processing unit, a shared vehicle management unit and a parking determination unit. The return request processing unit is configured to receive, from a mobile device of a user, a shared vehicle return request including terminal identification information of the mobile device and parking spot identification information. The shared vehicle management unit is configured to identify the shared vehicle based on the terminal identification information of the mobile device. The parking determination unit is configured to determine, based (Continued)

on the parking spot identification information, that the shared vehicle identified by the shared vehicle management unit is parked on a parking spot corresponding to the parking spot identification information. The return request processing unit is further configured to transmit a notification of completion of return to the mobile device.

7 Claims, 5 Drawing Sheets

(51) Int. Cl.
| | |
|---|---|
| *G06K 19/06* | (2006.01) |
| *G06K 19/07* | (2006.01) |
| *G06Q 20/10* | (2012.01) |
| *G06Q 50/30* | (2012.01) |
| *G08G 1/017* | (2006.01) |
| *G06V 20/10* | (2022.01) |
| *G06Q 20/32* | (2012.01) |
| *G06V 20/62* | (2022.01) |

(52) U.S. Cl.
CPC ....... *G06K 19/0723* (2013.01); *G06Q 20/102* (2013.01); *G06Q 20/32* (2013.01); *G06Q 50/30* (2013.01); *G06V 20/10* (2022.01); *G08G 1/017* (2013.01); *G08G 1/145* (2013.01); *G06V 20/625* (2022.01)

(58) Field of Classification Search
CPC ......... G06K 19/0723; G06K 19/06037; G06Q 20/102; G06Q 20/32; G06Q 50/30; G06Q 20/3224; G06Q 20/127; G06Q 20/322; G06V 20/10; G06V 20/625; G07B 1/00; G07F 17/0057; G07F 17/24; G07F 17/246; Y02T 10/70; Y02T 10/7072; Y02T 90/12; Y02T 90/16

See application file for complete search history.

(56) References Cited

U.S. PATENT DOCUMENTS

| | | | |
|---|---|---|---|
| 2014/0278608 A1* | 9/2014 | Johnson | ................ B60R 25/245 |
| | | | 705/5 |
| 2016/0063616 A1* | 3/2016 | Bassett | .............. G06Q 30/0645 |
| | | | 705/13 |

FOREIGN PATENT DOCUMENTS

| | | |
|---|---|---|
| JP | 2002-279310 | 9/2002 |
| JP | 2003-016578 | 1/2003 |
| JP | 2004-220105 | 8/2004 |
| JP | 2010-146229 | 7/2010 |
| JP | 2010-257111 | 11/2010 |
| JP | 2010-272102 | 12/2010 |
| JP | 5554461 B1 | 7/2014 |
| JP | 2015-001781 | 1/2015 |
| JP | 2015225368 A | 12/2015 |
| JP | 2017-068449 | 4/2017 |
| KR | 1020120026221 A | 3/2012 |
| KR | 1020140056527 A | 5/2014 |
| KR | 1020140075904 A | 6/2014 |

OTHER PUBLICATIONS

Office Action issued for Japanese Patent Application No. 2021-528311, dated Mar. 29, 2022, 8 pages including machine translation.

* cited by examiner

METHOD, SYSTEM, AND COMPUTER-READABLE STORAGE MEDIUM FOR MANAGING SHARED VEHICLE

TECHNICAL FIELD

The present disclosure relates to a method, system and computer-readable storage medium to manage a shared vehicle and more particularly, to a system and method to manage a return of a shared vehicle.

BACKGROUND

Unless otherwise indicated herein, the materials described in this section are not prior art to the claims in this application and are not admitted as prior art by inclusion in this section.

Recently, with development of public transportation system and increase in traffic volume, the use of public transportation has increased and the burden of purchase cost and maintenance cost for personal vehicles has increased. For this reason, interest in shared vehicles has also increased. In order to use a shared vehicle, a user needs to make a reservation in advance and move to the shared vehicle parked at a predetermined location. Since an increase in the use of shared vehicles also serves public purposes such as reducing pollution factors, public institutions have encouraged the use of shared vehicles. As such a shared vehicle is used by a plurality of users, accurate management of the shared vehicle is required.

According to Korean Patent Publication No. 10-2015-0053845, the location coordinates of a shared vehicle are obtained using a location tracking device such as a GPS in order to return the shared vehicle. However, in urban areas with a lot of vehicles, it is required to park in a legal parking spot. Furthermore, if the shared vehicle is a special vehicle such as an electric vehicle, it needs to be parked in a predetermined parking spot (for example, a parking spot with a charger). However, it is difficult to accurately manage parking or return of a vehicle by the location tracking method according to the prior art.

SUMMARY

In view of the foregoing, the present disclosure provides a method, system and program stored in a computer-readable storage medium for effectively managing parking and/or return of a shared vehicle.

In some embodiments of the present disclosure, a method for managing a shared vehicle is described. An example method may include: receiving, from a mobile device of a user, a return request including terminal identification information of the mobile device and parking spot identification information; identifying a shared vehicle associated with the user based on the terminal identification information; determining, based on the parking spot identification information, that the shared vehicle is parked on a parking spot corresponding to the parking spot identification information; and transmitting a notification of completion of return to the mobile device. The parking spot identification information may include information obtained from a Quick Response (QR) code or a Near Field Communication (NFC) tag.

In some examples, the determining that the shared vehicle is parked on the parking spot may include: identifying a parking lot corresponding to the parking spot based on the parking spot identification information; receiving, from a local device associated with the identified parking lot, entry information of the shared vehicle into the parking lot; and determining, based on the entry information of the shared vehicle into the parking lot, that the shared vehicle has entered the parking lot.

In some other embodiments, a shared vehicle management system for managing a shared vehicle is described. An example shared vehicle management system may include a return request processing unit, a shared vehicle management unit and a parking determination unit. The return request processing unit may be configured to receive, from a mobile device of a user, a shared vehicle return request including terminal identification information of the mobile device and parking spot identification information. The shared vehicle management unit may be configured to associate and store the mobile device and the shared vehicle associated with the user and identify the shared vehicle based on the terminal identification information of the mobile device. The parking determination unit may be configured to determine, based on the parking spot identification information, that the shared vehicle identified by the shared vehicle management unit is parked on a parking spot corresponding to the parking spot identification information. The return request processing unit may be further configured to transmit a notification of completion of return to the mobile device.

According to some other embodiments, a computer program stored in a recording medium of a central server and configured to cause the central server to manage a shared vehicle is described. An example computer program may include one or more computer-executable instructions that, when executed, cause the central server to perform: receiving, from a mobile device of a user, a return request including terminal identification information of the mobile device and parking spot identification information; identifying a shared vehicle associated with the user based on the terminal identification information; identifying a parking lot corresponding to a parking spot, which corresponds to the parking spot identification information, based on the parking spot identification information; receiving, from a local device associated with the identified parking lot, entry information of the shared vehicle into the parking lot; determining, based on the entry information of the shared vehicle into the parking lot, that the shared vehicle has entered the parking lot; and transmitting a notification of completion of return to the mobile device in response to the determining.

The foregoing summary is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

The foregoing and other features of the present disclosure will be described in detail with reference to the accompanying drawings. Understanding that these drawings depict only several examples in accordance with the disclosure and are, therefore, not to be considered limiting of its scope, the disclosure will be described with additional specificity and detail through use of the accompanying drawings, in which.

DETAILED DESCRIPTION

Hereafter, embodiments and examples will be described in detail with reference to the accompanying drawings so that the present disclosure may be readily implemented by those skilled in the art. However, it is to be noted that the present disclosure is not limited to the embodiments and examples but can be embodied in various other ways.

The present disclosure generally relates to a method, system and a computer-readable storage medium for managing a shared vehicle.

Figure 1:
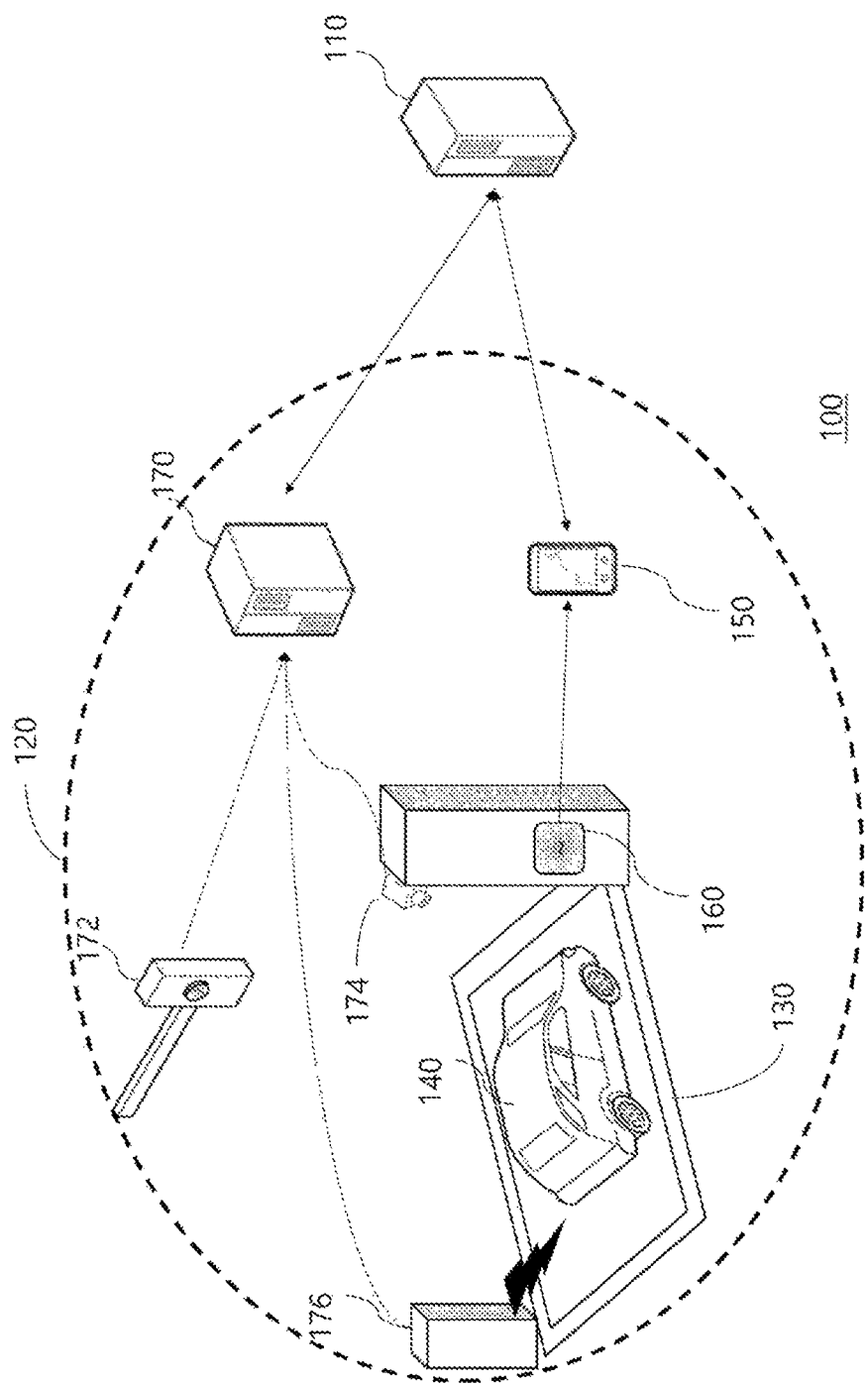
FIG. 1 is an environmental view illustrating an example system for managing a shared vehicle that is returned to a parking lot, in accordance with at least some embodiments of the present disclosure.

FIG. 1 is an environmental view illustrating an example system 100 for managing a shared vehicle that is returned to a parking lot, in accordance with at least some embodiments of the present disclosure. Example system 100 may include a central server 110 and a parking lot 120. Here, central server 110 may be an application server, a standalone server, a web server, and any computing device having other data transmission/reception functions, data identification functions and data processing functions. Although FIG. 1 shows one parking lot 120, example system 100 may include a plurality of parking lots such as parking lot 120 shown in FIG. 1 according to an embodiment of the present disclosure. However, the relationship between central server 110 and one parking lot 120 is illustrated in FIG. 1 for convenience of explanation. Parking lot 120 may include at least one parking spot 130. A user (not shown) may be allowed to use a shared vehicle 140 and may be required to return shared vehicle 140 to a predetermined location such as parking spot 130.

After the user parks shared vehicle 140 on the parking spot 130, the user may initiate a return process of shared vehicle 140 using a mobile device 150 of the user. In some embodiments, the user may transmit a return request of shared vehicle 140 to central server 110 using mobile device 150, and central server 110 may receive this return request. The return request may include terminal identification information for mobile device 150 of the user and parking spot identification information for parking spot 130.

In some examples, mobile device 150 may transmit the parking spot identification information of parking spot 130 to central server 110. In some examples, the parking spot identification information may include information obtained from a Quick Response (QR) code or a Near Field Communication (NFC) tag. That is, mobile device 150 may obtain the parking spot identification information of parking spot 130 by recognizing a parking spot identification device 160, such as a QR code or an NFC tag, corresponding to parking spot 130. Such a parking spot identification device may be installed near parking spot 130, for example, as shown in FIG. 1.

In addition, mobile device 150 may transmit the terminal identification information of mobile device 150 to central server 110 together with the parking spot identification information. The terminal identification information may include various information for identifying mobile device 150.

Central server 110 may include a database in which data associating the terminal identification information with the user of mobile device 150 are stored in advance. Such a database may also associate the shared vehicle 140 with the mobile device 150 and/or the user of the mobile device 150. Central server 110 may identify sharing vehicle 140 associated with the user based on the terminal identification information received from the user's mobile device 150.

Thereafter, the central server 110 may determine, based on the parking spot identification information received from the user's mobile device 150, that the shared vehicle 140 is parked on the parking spot 130 corresponding to the parking spot identification information. In some examples, the central server 110 may include a database in which data associating the parking lot 120 with at least one parking spot including the parking spot 130 inside parking lot 120 are stored in advance. Central server 110 may identify parking lot 120 based on the parking spot identification information received from mobile device 150. Central server 110 may receive information of shared vehicle 140 from a local device 170 associated with identified parking lot 120.

The information of shared vehicle 140 refers to entry information of shared vehicle 140 into parking lot 120 and may include various types of information for confirming that shared vehicle 140 has entered parking lot 120. In some examples, when shared vehicle 140 enters parking lot 120, it may pass through a parking barrier 172 of the parking lot. Then, parking barrier 172 may identify shared vehicle 140, for example, vehicle number information of shared vehicle 140, and local device 170 may obtain such information. Additionally or alternatively, when shared vehicle 140 is parked on parking spot 130, a parking identification device 174 installed near parking spot 130 may identify shared vehicle 140, for example, vehicle number information of shared vehicle 140, and local device 170 may obtain such information. Additionally or alternatively, if shared vehicle 140 is an electric vehicle (electric car), the user may park shared vehicle 140 on parking spot 130 to return shared vehicle 140 and then connect shared vehicle 140 to a charging device 176 installed near parking spot 130. In this example, local device 170 can obtain charging connection information indicating that shared vehicle 140 is connected to charging device 176.

In some examples, local device 170 may be, but is not limited to, a local server that manages parking lot 120. In some other examples, local device 170 may be any type of computing device, such as a desktop, laptop, portable personal terminal (PDA), smartphone, etc., configured to execute an application that can be used to manage parking lot 120, such as an on-road parking lot.

In an example, parking lot 120 may be a general parking lot whose parking space is bounded by a structure, such as a wall, boundary line, or the like. In this example, parking barrier 172 may be installed at the entrance of parking lot 120. The user may drive shared vehicle 140 to pass through parking barrier 172 and park shared vehicle 140 on parking spot 130. Thereafter, the user may use mobile device 150 of the user to recognize parking spot identification device 160, such as a QR code or an NFC tag, installed near parking spot 130, for example, on a pillar in parking spot 130. The mobile device may obtain parking spot identification information from the QR code or the NFC tag and transmit the obtained parking spot identification information to central server 110 together with the terminal identification information of mobile device 150. Central server 110 may identify shared vehicle 140 associated with the user based on the terminal identification information and request entry information of shared vehicle 140 from local device 170, for example, the local server. Local server 170 may transmit, to the central server 110, image information taken at the time of entry into parking lot 120 or vehicle number information recognized at the time of entry, vehicle number information obtained from parking spot identification device 174 installed near parking spot 130 and/or, if shared vehicle 140 is an electric vehicle, connection information indicating that shared vehicle 140 is connected to charging device 176.

In an example, parking lot 120 may be an on-road parking lot whose parking space is not bounded by a structure, such as a wall, a boundary line, or the like, and not equipped with parking barrier 172. In this example, the local device 170 may be a personal device, such as a smartphone, used by an operator of parking lot 120, the operator may use a parking lot operational application installed on the smartphone to manage a vehicle parked in parking lot 120. The operator may use a parking lot operational application installed on local device 170 to directly manage a vehicle parked in the on-road parking lot 120. In addition, local device 170 may be connected to parking spot identification device 174 and/or charging device 176 that can be installed in the on-road parking lot through the parking lot operational application installed on local device 170 so that the operator can manage a vehicle parked in on-road parking lot 120. As a result, local device 170 of the on-road parking lot may also communicate with central server 110 as in the example of a general parking lot, and central server 110 may also manage shared vehicle 140 parked in on-road parking lot 120.

Central server 110 may receive entry information of shared vehicle 140 from local device 170 as described above. In some embodiments, central server 110 may determine that shared vehicle 140 has entered parking lot 120 based on the entry information received from the local device 170. In addition, central server 110 may determine that shared vehicle 140 is parked on parking spot 130 of parking lot 120.

When central server 110 determines that shared vehicle 140 has entered parking lot 120 or based on this determination, central server 110 determines that shared vehicle 140 is parked on parking spot 130 of parking lot 120, central server 110 may transmit, to mobile device 150, a notification that the user has completed a return of shared vehicle 140.

In some additional or alternative examples, when it is determined that shared vehicle 140 has entered parking lot 120 or based on this determination, it is determined that shared vehicle 140 is parked on parking spot 130 of parking lot 120, central server 110 may transmit, to mobile device 150, a request for payment of a fee for the use of shared vehicle 140. In this example, when mobile device 150 pays the fee in response to the payment request transmitted by central server 110, central server 110 may transmit a notification of completion of return of shared vehicle 140 to mobile device 150 in response to the payment of the fee.

Figure 2:
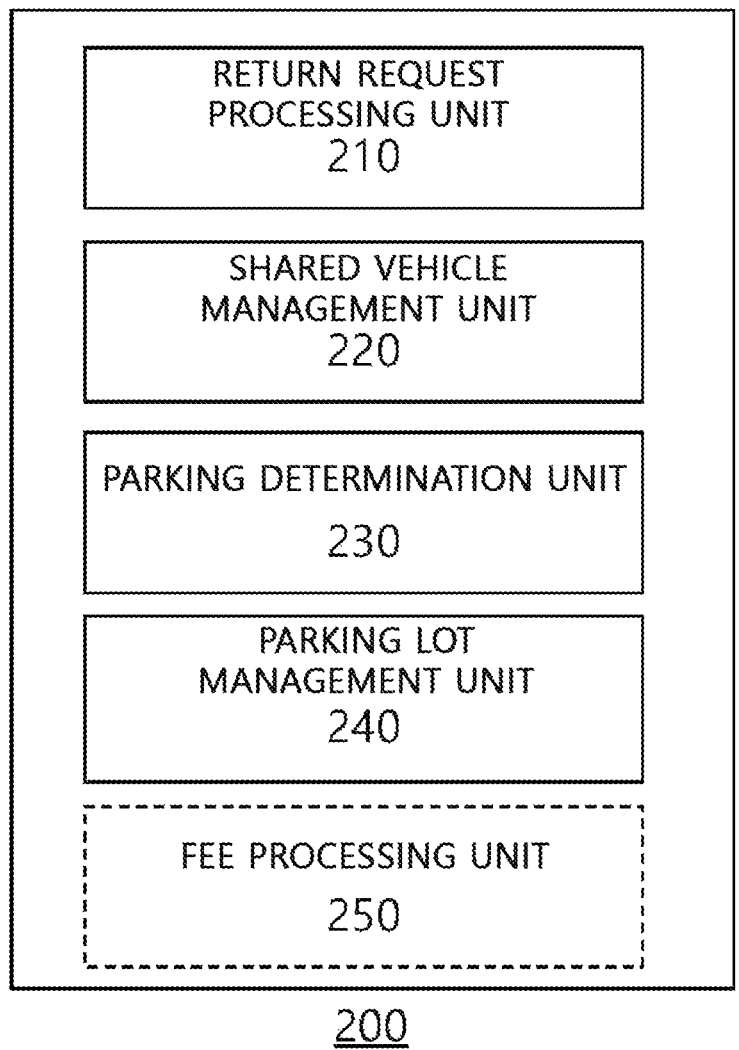
FIG. 2 is a block diagram illustrating an example shared vehicle management system for managing a shared vehicle that is returned to a parking lot, in accordance with at least some embodiments of the present disclosure.

FIG. 2 is a block diagram illustrating an example shared vehicle management system 200 for managing a shared vehicle that is returned to a parking lot, in accordance with at least some embodiments of the present disclosure. The shared vehicle management system 200 may perform the same or similar function as the central server 110 of FIG. 1. Therefore, the shared vehicle management system 200 may be an application server, a standalone server, a web server, and any type of computing device having other data transmission/reception functions, data identification functions and data processing functions.

In some embodiments, the shared vehicle management system 200 may include a return request processing unit 210, a shared vehicle management unit 220, a parking determination unit 230 and a parking lot management unit 240. In some additional embodiments, shared vehicle management system 200 may further include a fee processing unit 250. The user may be allowed to use a shared vehicle and may be required to return the shared vehicle to a particular parking spot. The user may use the user's mobile device to transmit, to the shared vehicle management system, a request to return the shared vehicle.

Return request processing unit 210 may be configured to receive the return request for the shared vehicle from the user's mobile device. In some examples, the return request for the shared vehicle may include terminal identification information of the mobile device and parking spot identification information. The parking spot identification information of the parking spot on which the shared vehicle is parked may include information obtained from, for example, a QR code or an NFC tag. The terminal identification information may include various information for identifying the user and/or the mobile device of the user.

Shared vehicle management unit 220 may associate and store the mobile device the shared vehicle associated with the user. The data stored in shared vehicle management unit 220 may be registered or stored in advance before the user returns the shared vehicle to the parking spot. Shared vehicle management unit 220 may be configured to identify the shared vehicle based on the terminal identification information included in the return request received by return request processing unit 210.

Parking determination unit 230 may be configured to determine, based on the parking spot identification information included in the return request received by return request processing unit 210, that the shared vehicle identified by shared vehicle management unit 220 is parked on a parking spot corresponding to the parking spot identification information. Parking lot management unit 240 may associate and store information of the parking spot and a parking lot corresponding to the parking spot. In some examples, Parking lot management unit 240 may be configured to identify the parking lot corresponding to the parking spot based on the parking spot identification information. Each of Shared vehicle management unit 220 and Parking lot management unit 240 is an example of a database. Therefore, Shared vehicle management unit 220 and parking lot management unit 240 may be implemented as one component or may be implemented as separate components.

In some examples, when parking lot management unit 240 identifies a parking lot, parking determination unit 230 may receive, from a local device associated with the identified parking lot, entry information of the shared vehicle into the parking lot, i.e., information for confirming that the shared vehicle has entered the parking lot. The entry information may include various types of information. In some examples, the local device may obtain information, such as vehicle number, recognized by a parking barrier installed at the entrance of the parking lot, a parking identification device installed near the parking spot, and the like. In some examples where the shared vehicle is an electric vehicle, parking determination unit 230 may be configured to receive, from the local device, charging connection information indicating that the shared vehicle is connected to a charger installed corresponding to the parking spot. As such, parking determination unit 230 may receive various information for confirming that the shared vehicle has entered the parking lot or that the shared vehicle is parked on the parking spot. Based on this information, parking determination unit 230 may determine that the shared vehicle has entered the parking lot or is parked on the parking spot.

When parking determination unit 230 determines that the shared vehicle has entered the parking lot or based on this determination, parking determination unit 230 determines that the shared vehicle is parked on the parking spot, return request processing unit 210 may transmit, to the user's mobile device, a notification that the user has completed a return of the shared vehicle.

Additionally or alternatively, when parking determination unit 230 determines that the shared vehicle is parked on the parking spot, fee processing unit 240 may request the user to pay a fee for the use of the shared vehicle. In this example, return request processing unit 210 may transmit a notification of completion of return to the mobile device in response to the result of fee payment processed by fee processing unit 240.

Figure 3:
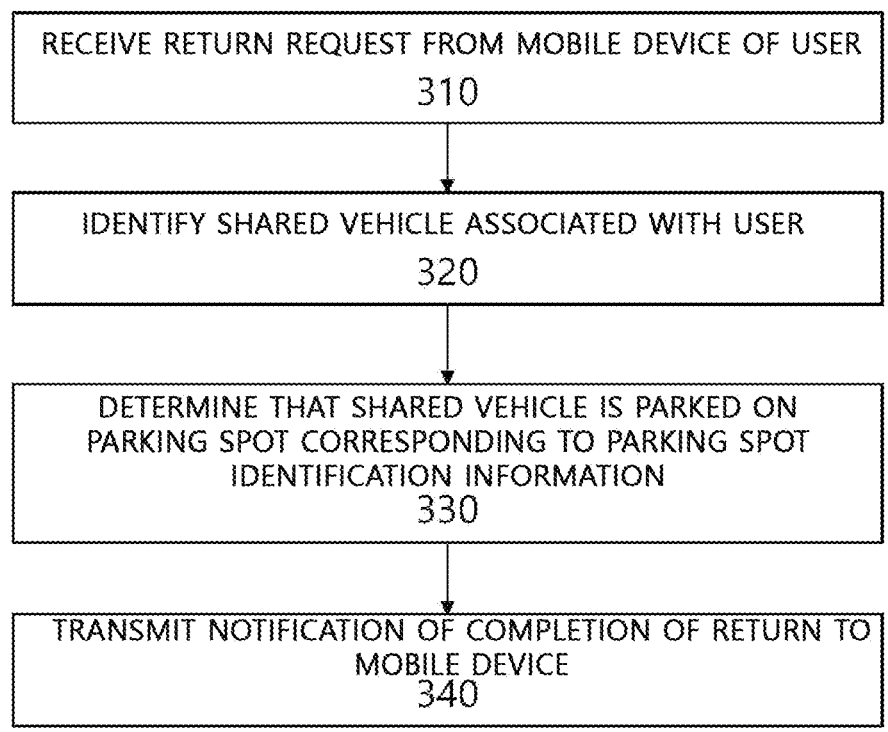
FIG. 3 is a flowchart illustrating an example process performed by a central server to manage a shared vehicle that is returned to a parking lot, in accordance with at least some embodiments of the present disclosure.

FIG. 3 is a flowchart illustrating an example process 300 performed by a computing device such as a central server to manage a shared vehicle that is returned to a parking lot, in accordance with at least some embodiments of the present disclosure. For example, process 300 may be performed under the control of a computing device, such as central server 110 of FIG. 1 and shared vehicle management system 200 of FIG. 2. Process 300 may be performed to manage a return of a shared vehicle allowed to be used by the user. Process 300 shown in FIG. 3 may include one or more operations, functions or actions as illustrated by blocks 310, 320, 330 and/or 340. The operations schematically illustrated in FIG. 3 are provided by way of example only, and some of the operations may be optional, may be combined into fewer operations, or may be extended to additional operations without departing from the spirit of the disclosed embodiment. Process 300 may begin at block 310 to receive a return request from the user's mobile device.

At block 310, the computing device may receive a return request of the shared vehicle from the user's mobile device. In some examples, the return request may include terminal identification information of the user's mobile device and parking spot identification information. The parking spot identification information may include information obtained from, for example, a QR code or an NFC tag. The terminal identification information may include various information for identifying the mobile device and/or the user of the mobile device. The process 300 may continue from block 310 to block 320 to identify a shared vehicle associated with the user.

At block 320, the computing device may identify the shared vehicle associated with the user based on the terminal identification information. In some examples, the computing device may previously associate and store the mobile device corresponding to the terminal identification information and the shared vehicle associated with the user. The computing device may identify the shared vehicle from the previously stored information based on the received terminal identification information. The process 300 may continue from block 320 to block 330 to determine that the shared vehicle is parked on a parking spot corresponding to the parking spot identification information.

At block 330, the computing device may determine, based on the parking spot identification information received at block 310, that the shared vehicle identified at block 320 is parked on the parking spot corresponding to the parking spot identification information. This determination will be described in more detail with reference to an example shown in FIG. 4.

Figure 4:
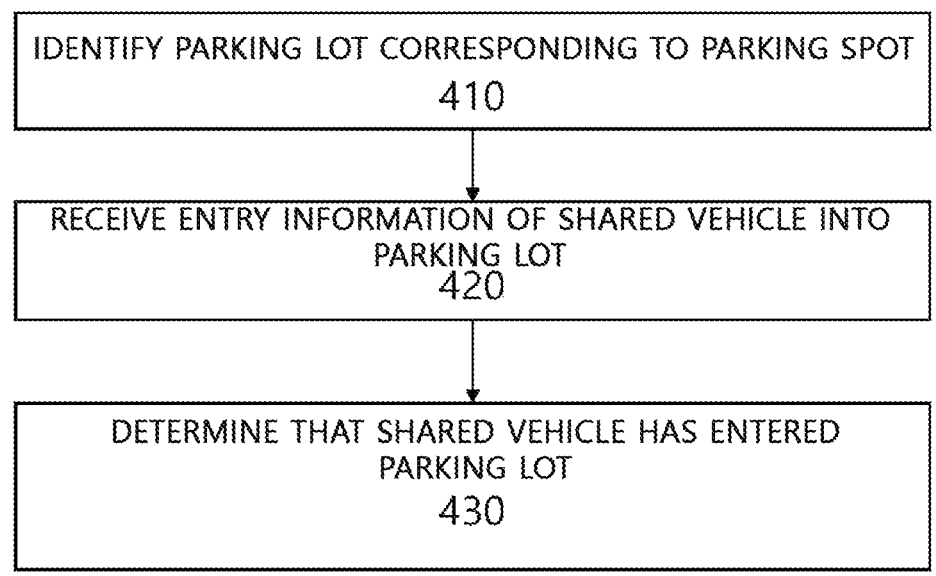
FIG. 4 is a flowchart illustrating the process of determining parking of FIG. 3 in more detail.

FIG. 4 is a flow chart illustrating the process for block 330 determining parking of FIG. 3 in more detail. The process for block 330 begins at block 410 to identify a parking lot corresponding to the parking spot. At block 410, the computing device may identify a parking lot corresponding to the parking spot based on the parking spot identification information. In some examples, the computing device may previously associate and store information of the parking spot and the parking lot corresponding to the parking spot and may identify the parking lot based on the parking spot identification information received from the mobile device. The process for block 330 may continue from block 410 to block 420 to receive entry information of the shared vehicle into the parking lot.

At block 420, the computing device may receive entry information of the shared vehicle into the parking lot from a local device associated with the parking lot identified at block 410. The entry information may include various types of information. The entry information may include vehicle number information obtained by, for example, a barrier of the local device in the parking lot, a parking identification device installed near the parking spot and the like, but is not limited thereto. In some examples where the shared vehicle is an electric vehicle, the entry information may include charging connection information indicating that the shared vehicle is connected to a charger installed corresponding to the parking spot. The process for block 330 may continue from block 420 to block 430 to determine that the shared vehicle has entered the parking lot.

At block 430, the computing device may determine that the shared vehicle has entered the parking lot based on the entry information received at block 420. In some examples, the computing device may also determine that the shared vehicle is parked on the parking spot based on the received entry information. As shown in FIG. 4, the computing device may determine that the shared vehicle is parked on the parking spot.

Returning to FIG. 3, process 300 may continue from block 330 to block 340 to transmit a notification of completion of return to the mobile device. At block 340, the computing device may transmit a notification of completion of return to the mobile device. In some examples, the computing device may transmit a notification of completion of return in response to the determination that the shared vehicle is parked on the parking spot. In some alternative or additional examples, the computing device may transmit, to the user's mobile device, a request for payment of a fee for the use of the shared vehicle. The computing device may transmit a notification of completion of return in response to the payment of the fee corresponding to the payment request.

As described above, according to the present disclosure, it is possible to effectively manage a return of a shared vehicle in association with a parking lot and it is convenient for a user to return the shared vehicle, and, thus, it is possible to facilitate the use of a shared vehicle.

Figure 5:
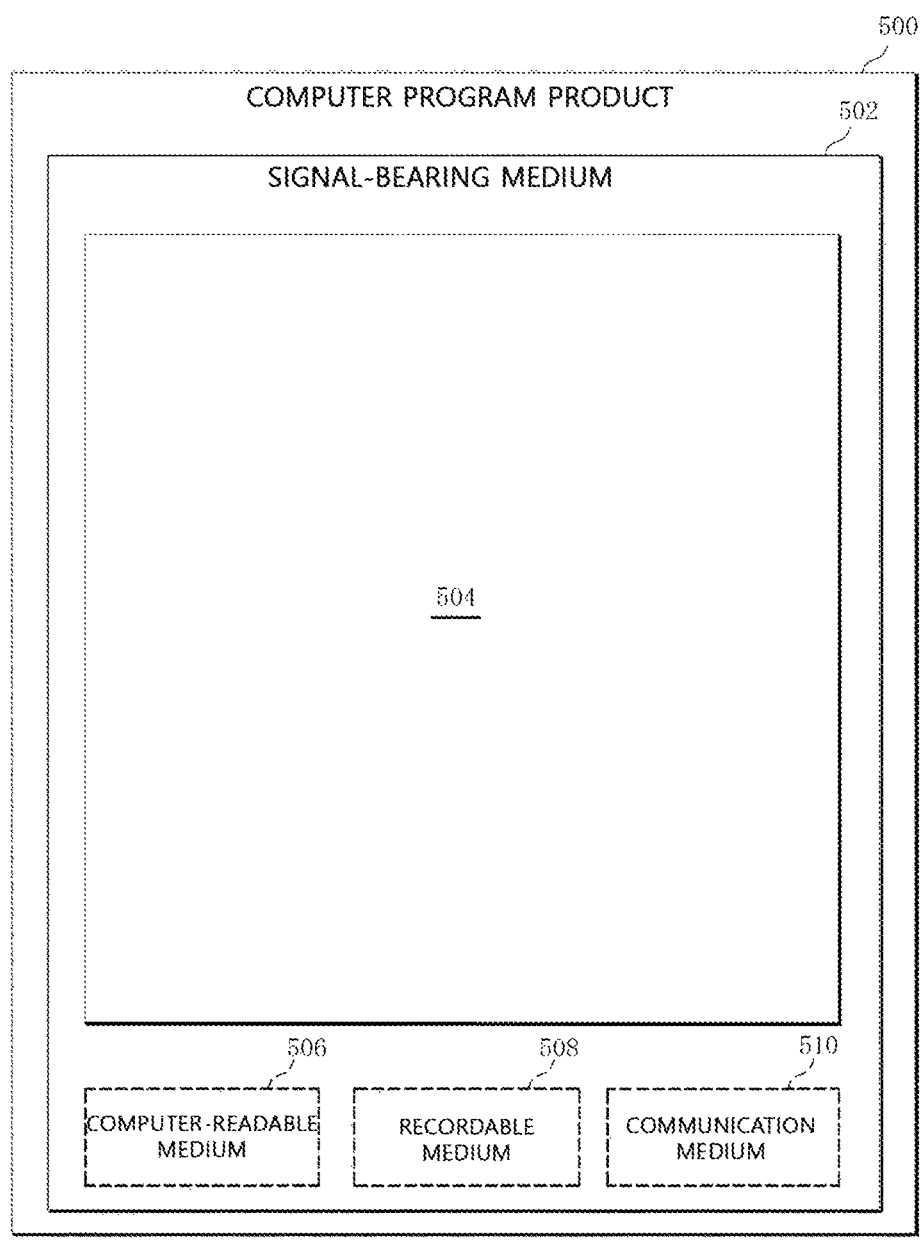
FIG. 5 illustrates an example computer program product that can be used to manage a shared vehicle, in accordance with at least some embodiments of the present disclosure.

FIG. 5 illustrates an example computer program product 500 that can be utilized to manage a shared vehicle, in accordance with at least some embodiments of the present disclosure. An example embodiment of an example computer program product is provided using a signal-bearing medium 502. In some embodiments, the signal-bearing medium 502 of one or more computer program products 500 may include a computer-readable medium 506, a recordable medium 508 and/or a communication medium 510.

Instructions 504 included in signal-bearing medium 502 may be executed by a computing device, such as central server 110 of FIG. 1 and/or shared vehicle management system 200 of FIG. 2. Instructions 504 may include one or more instructions that cause the computing device to receive, from a mobile device of a user, a return request including terminal identification information of the mobile device and parking spot identification information; one or more instructions that cause the computing device to identify a shared vehicle associated with the user based on the terminal identification information; one or more instructions that cause the computing device to identify a parking lot corresponding to a parking spot, which corresponds to the parking spot identification information, based on the parking spot identification information; one or more instructions that cause the computing device to receive entry information of a shared vehicle into the parking lot from a local device associated with the identified parking lot; one or more instructions that cause the computing device to determine that the shared vehicle has entered the parking lot based on the entry information of the shared vehicle into the parking lot; and one or more instructions that cause the computing device to transmit a notification of completion of return to the mobile device in response to the determining, when executed.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Throughout this disclosure, the term "connected to" may be used to designate a connection or coupling of one element to another element and includes both an element being "directly connected to" another element and an element being "electronically connected to" another element via another element. Through the whole disclosure, the term "on" that is used to designate a position of one element with respect to another element includes both a case that the one element is adjacent to the other element and a case that any other element exists between these two elements. Further, through the whole disclosure, the term "comprises or includes" and/or "comprising or including" used in the disclosure means that one or more other components, steps, operation and/or existence or addition of elements are not excluded in addition to the described components, steps, operation and/or elements unless context dictates otherwise. Through the whole disclosure, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A method, performed under the control of a central server, to manage a shared vehicle, comprising:
   receiving, from a mobile device of a user, a return request including terminal identification information of the mobile device and parking spot identification information;
   identifying a shared vehicle associated with the user based on the terminal identification information;
   determining that the shared vehicle is parked on a parking spot corresponding to the parking spot identification information; and
   transmitting a notification of completion of return to the mobile device,
      wherein the shared vehicle is an electric vehicle, and
      wherein the determining includes:
         identifying a parking lot corresponding to the parking spot based on the parking spot identification information;
         receiving, from a local device corresponding to the parking lot, entry information of the shared vehicle into the parking lot and charging connection information indicating that the shared vehicle is connected to a charger that is installed corresponding to the parking spot, wherein the entry information includes vehicle number information of the shared vehicle identified by a parking identification device installed near the parking spot;
         determining, based on the entry information of the shared vehicle into the parking lot, that the shared vehicle has entered the parking lot; and
         determining that the shared vehicle is parked on the parking spot corresponding to the parking spot identification information based on the parking spot identification information, the identified vehicle number information, and the charging connection information.

2. The method of claim 1, wherein the parking spot identification information includes information obtained from a Quick Response (QR) Code or a Near Field Communication (NFC) Tag.

3. The method of claim 1, further comprising:
   in response to the determining, transmitting a request for payment of a fee for the user's use of the shared vehicle,
   wherein the transmitting the notification of completion of return to the mobile device includes:
      in response to the payment of the fee, transmitting the notification of completion of return.

4. A system to manage a shared vehicle, comprising:
   a return request processing unit configured to receive, from a mobile device of a user, a shared vehicle return request including terminal identification information of the mobile device and parking spot identification information;
   a shared vehicle management unit configured to associate and store the mobile device and the shared vehicle associated with the user and identify the shared vehicle based on the terminal identification information of the mobile device;
   a parking determination unit configured to determine that the shared vehicle identified by the shared vehicle management unit is parked on a parking spot corresponding to the parking spot identification information; and
   a parking lot management unit configured to associate and store the parking spot and a parking lot corresponding to the parking spot and identify the parking lot based on the parking spot identification information,
      wherein the return request processing unit is further configured to transmit, to the mobile device, a notification of completion of return,
      wherein the shared vehicle is an electric vehicle, and
      wherein the parking determination unit is configured to:
         receive, from a local device associated with the parking lot identified by the parking lot management unit, entry information of the shared vehicle into the parking lot and charging connection information indicating that the shared vehicle is connected to a charger installed corresponding to the parking spot, wherein the entry information includes vehicle number information of the shared vehicle identified by a parking identification device installed near the parking spot;
         determine, based on the entry information of the shared vehicle into the parking lot, that the shared vehicle has entered the parking lot; and
         determine that the shared vehicle is parked on the parking spot corresponding to the parking spot identification information based on the parking spot identification information, the identified vehicle number information, and the charging connection information.

5. The system of claim 4, wherein the parking spot identification information includes information obtained from a Quick Response (QR) Code or a Near Field Communication (NFC) Tag.

6. The system of claim 4, further comprising:
   a fee processing unit configured to request the user to pay a fee for the use of the shared vehicle when the parking determination unit determines that the shared vehicle is parked on the parking spot,
   wherein the return request processing unit is configured to transmit the notification of completion of return in response to the result of fee payment processed by the fee processing unit.

7. A computer program stored in a recording medium of a central server to manage a shared vehicle, wherein the shared vehicle is an electric vehicle, the computer program includes one or more computer-executable instructions that, when executed, cause the central server to perform:
   receiving, from a mobile device of a user, a return request including terminal identification information of the mobile device and parking spot identification information;

identifying a shared vehicle associated with the user based on the terminal identification information;

identifying a parking lot corresponding to a parking spot, based on the parking spot identification information, wherein the parking spot corresponds to the parking spot identification information;

receiving, from a local device associated with the identified parking lot, entry information of the shared vehicle into the parking lot, wherein the entry information includes vehicle number information of the shared vehicle identified by a parking identification device installed near the parking spot;

determining, based on the entry information of the shared vehicle into the parking lot, that the shared vehicle has entered the parking lot;

receiving charging connection information indicating that the shared vehicle is connected to a charger installed corresponding to the parking spot;

determining, based on the identified vehicle number information, the parking spot identification information, and the charging connection information, that the shared vehicle is parked on the parking spot corresponding to the parking spot identification information; and in response to the determining that the shared vehicle is parked on the parking spot, transmitting a notification of completion of return to the mobile device.

* * * * *